(12) United States Patent
Dickman

(10) Patent No.: US 6,986,118 B2
(45) Date of Patent: Jan. 10, 2006

(54) METHOD FOR CONTROLLING SEMICONDUCTOR CHIPS AND CONTROL APPARATUS

(75) Inventor: Rory Dickman, Graz (AT)

(73) Assignee: Infineon Technologies AG, Munich (DE)

(*) Notice: Subject to any disclaimer, the term of this patent is extended or adjusted under 35 U.S.C. 154(b) by 123 days.

(21) Appl. No.: 10/672,145

(22) Filed: Sep. 26, 2003

(65) Prior Publication Data

US 2004/0230932 A1 Nov. 18, 2004

(30) Foreign Application Priority Data

Sep. 27, 2002 (DE) ................. 102 45 272
Sep. 19, 2003 (DE) ................. 103 43 525

(51) Int. Cl.
*G06F 17/50* (2006.01)

(52) U.S. Cl. .................... 716/8; 716/1; 716/2
(58) Field of Classification Search ............ 716/8, 716/1, 4, 2
See application file for complete search history.

(56) References Cited

U.S. PATENT DOCUMENTS

| | | | | |
|---|---|---|---|---|
| 3,972,028 A | * | 7/1976 | Weber et al. | 711/220 |
| 3,975,714 A | * | 8/1976 | Weber et al. | 711/218 |
| 5,154,514 A | * | 10/1992 | Gambino et al. | 374/178 |
| 6,148,363 A | * | 11/2000 | Lofgren et al. | 711/103 |
| 6,209,074 B1 | * | 3/2001 | Dell et al. | 711/170 |
| 6,338,113 B1 | * | 1/2002 | Kubo et al. | 711/105 |
| 6,438,014 B2 | * | 8/2002 | Funaba et al. | 365/63 |
| 6,483,769 B2 | * | 11/2002 | La | 365/233 |
| 6,615,326 B1 | * | 9/2003 | Lin | 711/154 |
| 6,714,433 B2 | * | 3/2004 | Doblar et al. | 365/63 |

FOREIGN PATENT DOCUMENTS

| | | |
|---|---|---|
| DE | 2350225 | 4/1974 |
| DE | 2400161 | 7/1974 |
| EP | 0880142 | 11/1998 |
| JP | 63299258 | 6/1988 |
| JP | 63273342 | 10/1988 |
| JP | 2001196516 | 7/2001 |
| JP | 11354701 | 3/2002 |

OTHER PUBLICATIONS

German Search Report dated Jun. 4, 2003; 3 Pages.

* cited by examiner

*Primary Examiner*—Sun James Lin
(74) *Attorney, Agent, or Firm*—Patterson & Sheridan, L.L.P.

(57) ABSTRACT

The invention relates to a method for operating semiconductor chips, particularly memory chips, which are arranged in groups on modules which are connected to a common data bus wherein each semiconductor chip on each module is connected to at least one data line in the common data bus comprising the following method steps:
  a) selecting a group of semiconductor chips from the semiconductor chips arranged on the modules based on a prescribed selection criterion independently of module, the selected group of semiconductor chips using data lines in the common data bus over the entire bus width;
  b) activating the semiconductor chips in the selected group; and
  c) performing data interchange between the data lines in the common data bus and the selected group of semiconductor chips.

18 Claims, 7 Drawing Sheets

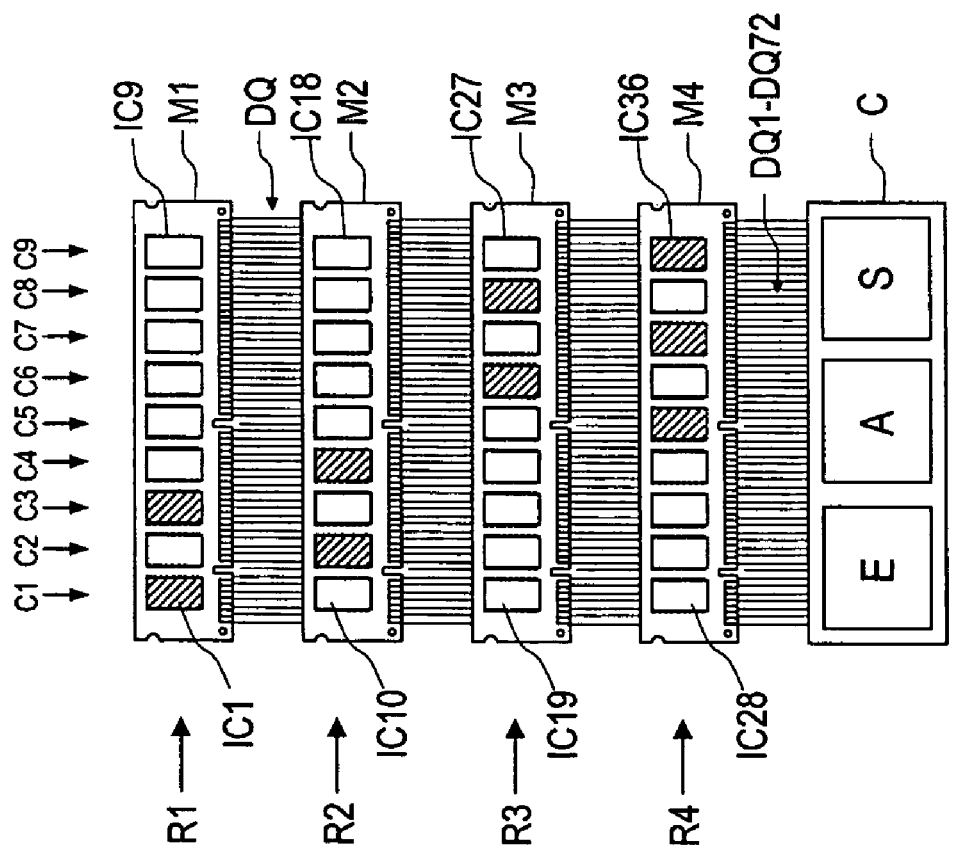

Fig.4a

| Bank 1 | CRS | |
|---|---|---|
| | C | R |
| | 1 | 1 |
| | 2 | 2 |
| | 3 | 1 |
| | 4 | 2 |
| | 5 | 4 |
| | 6 | 3 |
| | 7 | 4 |
| | 8 | 3 |
| | 9 | 4 |

Fig.4b

| Bank 2 | CRS | |
|---|---|---|
| | C | R |
| | 1 | 4 |
| | 2 | 3 |
| | 3 | 4 |
| | 4 | 3 |
| | 5 | 1 |
| | 6 | 2 |
| | 7 | 1 |
| | 8 | 2 |
| | 9 | 1 |

US 6,986,118 B2

METHOD FOR CONTROLLING SEMICONDUCTOR CHIPS AND CONTROL APPARATUS

CROSS-REFERENCE TO RELATED APPLICATIONS

This application claims foreign priority benefits under 35 U.S.C. § 119 to co-pending German patent application number 103 43 525.5 filed Sep. 19, 2003, which claims priority of German patent application number 102 45 272.5 filed Sep. 27, 2002. These related patent applications are herein incorporated by reference in its entirety.

BACKGROUND OF THE INVENTION

1. Field of the Invention

The invention relates to a method for controlling semiconductor chips, particularly memory chips, which are arranged in groups on modules. The invention also relates to a control apparatus for carrying out the method.

2. Description of the Related Art

Modern electronic systems normally comprise a multiplicity of semiconductor chips which are used as supports for integrated circuits. The large scale of integration achieved for these circuits using present methods allows a multiplicity of functions to be produced on a single semiconductor chip. Thus, by way of example, single dynamic memory chips (DRAMs) already contain more than 64 million individual memory cells.

Despite these large scales of integration, it is frequently necessary for functional units in electronic systems, such as the main memory in a computer system, to be made up of a plurality of individual components. In this case, the functional units are frequently distributed over a plurality of semiconductor chips which are then arranged in groups on modules.

There can be various reasons for using modules in this case. First, a modular design allows the use of relatively small semiconductor chips, which can normally be produced much less expensively. In addition, physical effects, such as the development of heat caused by power dissipation on the semiconductor chips, can make it appropriate to use a plurality of small units. Generally, using a modular design also allows flexible design of the corresponding functional device in the electronic system to be achieved.

To incorporate the semiconductor chips arranged on modules into the respective electronic system, bus systems are used which connect the semiconductor chips to corresponding components in the electronic system, such as to the central processor (central processing unit).

Particularly in modern electronic computer systems, whose main memory is generally constructed from a plurality of modules which each have a plurality of memory chips, a memory control unit (memory controller) undertakes connection of the memory chips to the common data bus. In this context, it forms a crucial component in the computer system, because its function involves controlling the data interchange between the processor and the memory.

Conventionally, memory chips in a module are firmly associated with a "bank" whose members simultaneously perform data interchange with the data bus. In this case, a bank comprises a particular number of memory chips in a module, the data lines of said memory chips together producing the exact word length of the corresponding data bus. This normally corresponds exactly to the number of memory chips arranged on a module. On account of the firm association for the memory chips, the memory control unit controls only the selection of firmly organized banks.

One problem which is found with the fixed organization of memory chips to form a bank, however, is that particularly the development of heat caused by the power dissipation in the memory chips can occur on a highly localized basis. In the case of some memory chips, a memory chip's rising temperature when heat develops (junction temperature) can then easily exceed a temperature which is critical for the respective semiconductor type, this being associated with a drastic increase in operating faults on the respective memory chip.

Since individual differences in the memory chips in a bank cannot be taken into account in the case of a firm bank organization, the development of heat, which is dependent on the respective degree of use and on the individual properties of a memory chip, normally results in an uneven temperature distribution in the memory chips along the corresponding module.

To prevent malfunctions in the memory chips, and hence to ensure a sufficiently high level of reliability for the memory chips, a module's memory chips which are firmly associated with a bank can be operated only at reduced power. This generally results in power losses for the entire memory.

To reduce power losses as a result of heat to which memory chips arranged on modules are subject, merely passive cooling elements are currently provided on the memory chips. Such passive cooling elements are described in JP 2001196516 A, JP 63299258 A, JP 63273342 A or JP 11354701 A, for example.

SUMMARY OF THE INVENTION

It is an object of the invention to provide an improved method for operating semiconductor chips which are arranged in groups on modules connected to a common data bus. It is also an object of the invention to provide an apparatus and an arrangement for carrying out the method.

Accordingly, the inventive method for operating semiconductor chips, particularly memory chips, which are arranged in groups on modules which are connected to a common data bus, where each semiconductor chip on each module is connected to at least one data line in the data bus, first involves a group of semiconductor chips being selected from the semiconductor chips arranged on the modules by a selection device on the basis of a prescribed selection criterion. In this case, the selection is made independently of the association between the semiconductor chips and the modules. Next, the selected group of semiconductor chips is activated by an activation device for the purpose of data interchange with the data lines in the data bus. Finally, in the next method step, data interchange is performed between the semiconductor chips in the selected group and the data lines in the data bus. Since the semiconductor chips are selected independently of module and on the basis of a prescribed criterion, it is respectively possible to select the most suitable semiconductor chips for data interchange with the data lines in the data bus. This has the advantage that the data interchange can be improved.

In one advantageous embodiment of the invention, the selection device selects respectively different semiconductor chips for the group in two method cycles taking place at successive times. This has the advantage that it may consequently be possible to avoid power losses which arise in semiconductor chips on account of prior activities.

In one particularly advantageous embodiment of the invention, the selection criterion provided for the group is the temperature of a semiconductor chip, with preferably semiconductor chips having the lowest temperature being selected. High operating temperatures are usually a great problem in connection with semiconductor circuits. Above a critical temperature, which is different for each semiconductor type, malfunctions in semiconductor circuits generally arise in large numbers. To avoid such unwanted operating states, the corresponding semiconductor chips need to be operated below the critical temperature. The inventive selection of the semiconductor chips having the lowest temperature thus permits improved operation of the semiconductor chips.

In another preferred embodiment of the invention, the group of semiconductor chips is selected using a statistical method. The use of a suitable statistical method which takes into account statistical information which is relevant to the operation of the semiconductor chips allows selection of the semiconductor chips to be optimized.

In one particularly advantageous embodiment of the invention, the statistical method provided for selecting the group of semiconductor chips takes into account the arrangement of the semiconductor chips on the modules and/or the arrangement of the modules (M1–M4) in relation to one another or in relation to other adjacent components. As a result, disadvantageous operating states which arise on account of the arrangement of the semiconductor chips or modules can be avoided.

In another advantageous embodiment of the invention, the statistical method takes into account empirically and/or currently ascertained data. The use of empirical data makes it possible to dispense with complex ascertainment of the current operating states. By contrast, the use of currently ascertained data allows an improved selection when operating conditions are fluctuating.

In another preferred embodiment of the invention, the selection probability for a semiconductor chip depends on its relative situation with respect to adjacent semiconductor chips, with a semiconductor chip which is arranged in the outer region of the modules having a greater selection probability than a semiconductor chip which is arranged in an inner region. This makes it possible to improve the operation of semiconductor chips which exceed their critical temperature particularly on account of relatively high temperature loading in an inner region of the modules and therefore have operating faults.

Another advantageous embodiment of the invention provides for the use of an assessment device in order to assess the semiconductor chips according to prescribed criteria, particularly temperature. The use of the assessment device allows the state of the semiconductor chips to be assessed currently and hence allows an optimized selection for each method cycle.

In another advantageous embodiment of the invention, each module has an associated individual index which denotes the corresponding module and the position of the corresponding semiconductor chip on the module. An advantage in this context is that single semiconductor chips can be addressed individually using the indices. It is also advantageous to store the indices for the selected group of semiconductor chips in a register device, as a result of which memory banks can be organized flexibly.

In addition, another advantageous embodiment of the invention provides for the memory chips to be selected at the beginning of a startup procedure in which the memory chips are started up. This allows data integrity to be ensured particularly easily.

In another advantageous embodiment of the invention, before a group of memory chips is selected, the data stored in the memory chips are stored in a buffer store. This makes it possible to ensure data integrity even when the banks are reorganized during ongoing operation of the memory chips. It is also possible to revert to methods which are already known for this purpose.

Another advantageous embodiment of the invention makes provision for a further group of memory chips to be selected. This allows the advantages of an interleaved method to be used, the groups of semiconductor chips being respectively alternated.

BRIEF DESCRIPTION OF THE DRAWINGS

The invention is explained in more detail below with reference to drawings, in which:

FIG. 3 shows four modules connected to a common data bus and a control apparatus in accordance with the invention, FIGS. 4a and 4b schematically show the association between the DRAM memory chips and an active group, FIG. 5 schematically shows an arrangement in accordance with the invention with a control apparatus in accordance with the invention, FIG. 6 schematically shows the design of a control apparatus in accordance with the invention.

DETAILED DESCRIPTION OF THE PREFERRED EMBODIMENT

Figure 1:
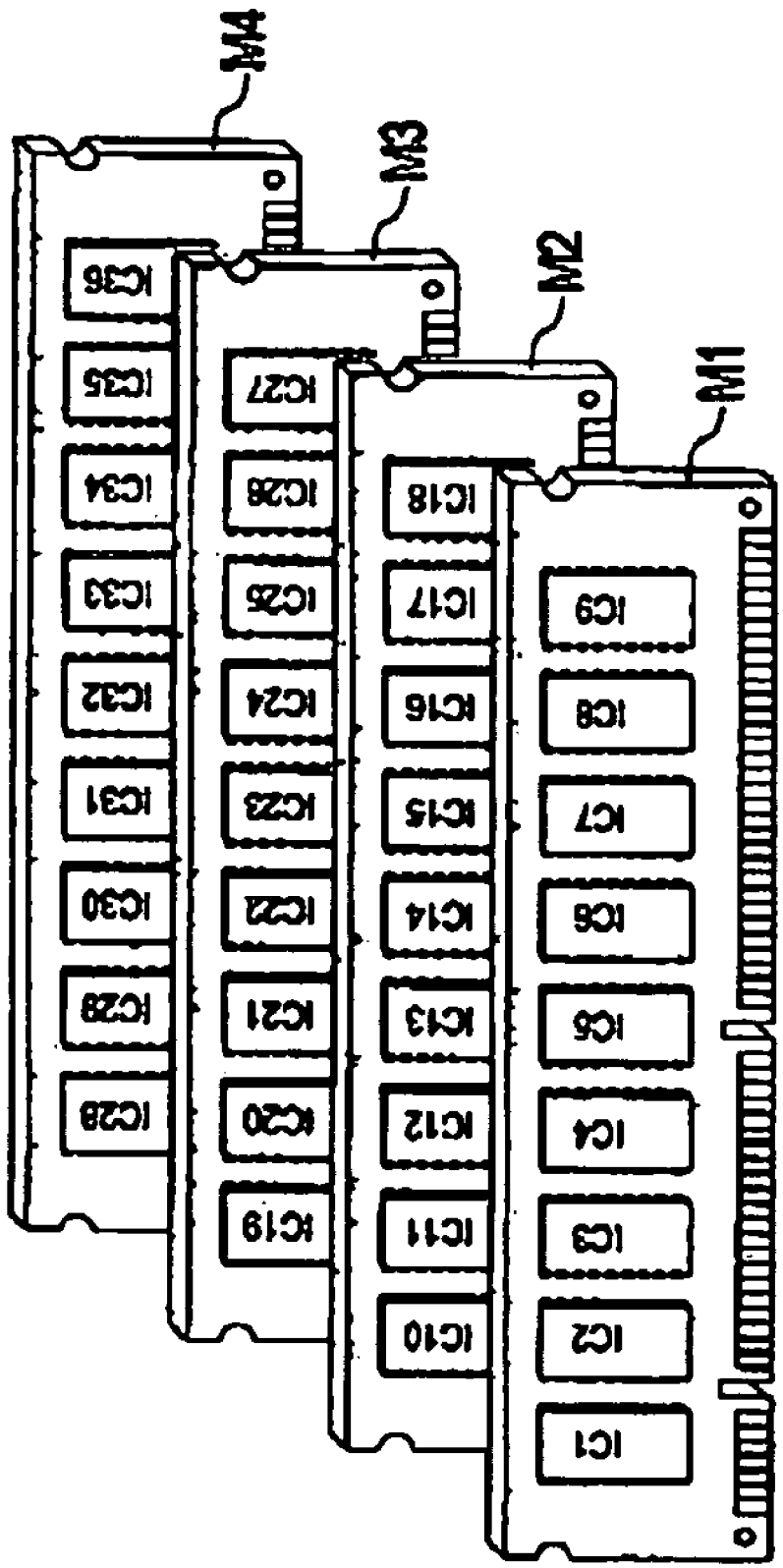
FIG. 1 shows an arrangement of four memory modules which each have nine DRAM memory chips.

FIG. 1 shows 36 very similar semiconductor chips IC1–IC36 which are arranged in groups to form nine respective semiconductor chips IC1–IC36 on four very similar modules M1–M4. In this context, the invention makes provision for any semiconductor chips. In the text below, however, the invention is explained by way of example with reference to memory chips which are arranged as DRAM memory chips, such as SDR and DDR SDRAMS, on memory modules, "single in-line memory modules" (SIMM) or "dual in-line memory modules" (DIMM). These memory modules, which are known from the area of computers, in particular, are frequently plugged, in the arrangement shown in FIG. 1, closely together into slots provided for this purpose in a motherboard (not shown in this case) and form the main memory of a computer system. By means of contacts which are preferably arranged along one long edge of a module M1–M4, the modules M1–M4 are connected to the data lines DQ1–DQ72 and also to supply and signal lines in a common data bus DQ (not shown in this case). The figure likewise does not show electrical connecting lines and circuits which are used to connect the memory chips IC1–IC36 to the signal, supply and data lines DQ1–DQ72 in the data bus DQ.

The consumption of electrical power brought about by operation of the semiconductor chips IC1–IC36 is usually manifested by an increase in the temperature of the corresponding semiconductor chips IC1–IC36. On account of the large scales of integration for modern semiconductor chips, and also the high clock rates used can easily reach a temperature which is critical for the respective semiconductor type. Above this temperature, a large number of malfunctions usually occur in the circuits on the corresponding semiconductor chips IC1–IC36, which means that there is no guarantee of the reliability of the semiconductor chips IC1–IC32 above the critical temperature.

The arrangement shown in FIG. 1, where semiconductor chips IC1–IC36 are arranged next to one another on modules M1–M4 which are in turn arranged closely together on the motherboard on account of a lack of space, generally promotes little air circulation or convection. This negative effect can be enhanced further by further components situated close to the modules M1–M4 and by the design of the corresponding electronic computer system itself, which means that semiconductor chips IC1–IC36 which are situated in a central region of the arrangement, in particular, are operated in critical temperature ranges. By contrast, the semiconductor chips IC1–IC36 which are situated in an outer region of the arrangement are subject to better air circulation or convection, which means that their operating temperature is usually significantly below the critical temperature. This operating temperature distribution for individual semiconductor chips IC1–IC36 which becomes established along the row arrangements of the semiconductor chips on a module M1–M4 can likewise be seen in the row arrangement of the modules M1–M4. Hence, better air circulation or convection means that the two outer modules M1, M4 will usually have a lower temperature than the modules M2, M3 inside this row arrangement, where the modules M2, M3 each have immediate neighbors on both sides.

In addition, semiconductor chips IC1–IC36 in a module M1–M4 can be heated up by further electrical components arranged adjacently on the respective module M1–M4, such as buffer or PLL components, which themselves have a high operating temperature.

Figure 2:
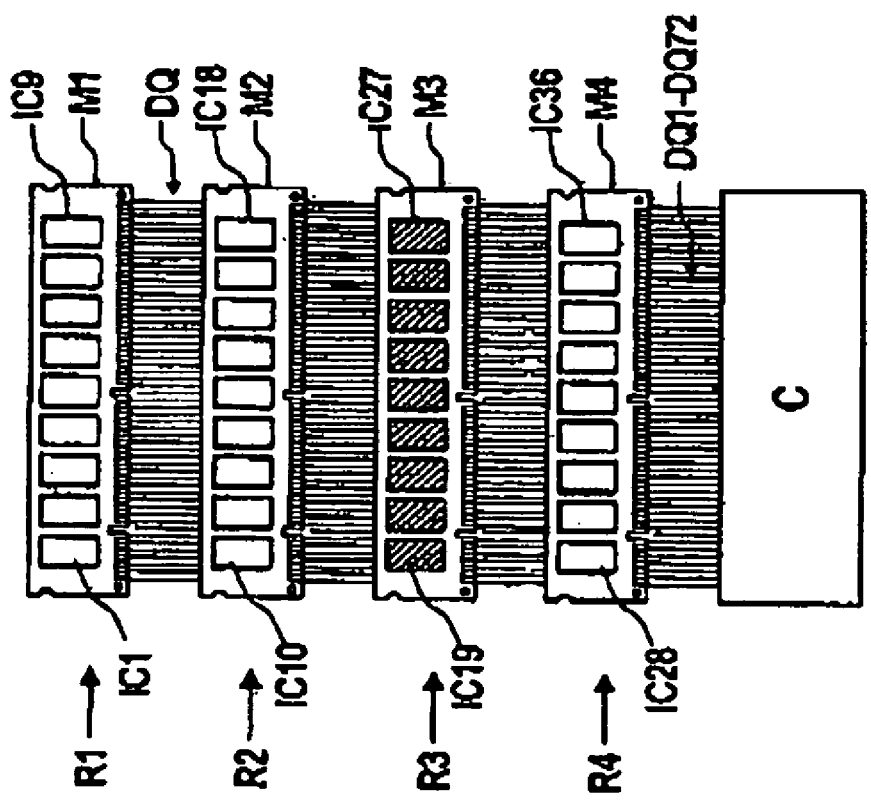
FIG. 2 shows four modules connected to a common data bus and a conventional control apparatus.

FIG. 2 shows a conventional design for a main memory in a computer system. In this case, four modules M1–M4 are connected to the data lines DQ1–DQ72 in a common data bus DQ whose operation is controlled by a control apparatus C. The four modules M1–M4 in FIG. 1 can be modem SDR or DDR SDRAM memory modules, for example, which, as "DJMMs" ("dual in-line memory modules"), each have eighteen memory chips IC1–IC36 which are respectively distributed over both sides of the module M1–M4 in groups of nine memory chips IC1–IC36. To improve clarity, however, only modules M1–M4 with components on one side are shown in this case. In the example shown, the data bus DQ connecting the four modules M1–M4 to the control apparatus C also has 72 data lines DQ1–DQ72 in addition to control and supply lines. Each of the modules M1–M4 has connecting lines and circuits which are used for connecting the lines in the data bus DQ, which are connected to the contacts on the modules M1–M4, to the memory chips IC1–IC36 arranged on the respective module M1–M4 (not shown in this case).

The conventional design of a modular main memory which is shown in FIG. 2 has a stipulated organization for the memorychips IC1–IC36. In this case, in the ×8 organization of the memory chips which is shown by way of example in this case, each memory chip IC1–IC36 in a module M1–M4 is connected to eight respective data lines DQ1–DQ72 In the data bus DQ. Full use of the 72-bit data bus DQ therefore respectively requires nine of the memory chips IC1–IC36.

As shown by shading in FIG. 2, a conventional bank organization makes provision for only the memory chips IC1–IC36 in a single module M1–M4 to be respectively activated for data interchange with the data lines DQ1–DQ72 in the data bus DQ. The entire data bus DQ is therefore used up by a respective single module M1–M4.

When using modules with a different organization, such as ×4, where each memory chip IC in a module M is connected to four respective data lines DQ1–DQ72, a 72-bit data bus DQ is used up only by 18 memory chips IC. In this regard, both sides of a DIMM are conventionally activated for data interchange. Since the memory chips IC1–IC36 in a module M1–M4 in the case of the conventional bank organization are activated in blocks for data interchange with the data bus DQ, it is not possible to take account of individual differences in the semiconductor chips IC1–IC36 which can arise on account of operation. These differences, particularly in the case of power-determining parameters, such as the temperature of a semiconductor chip, generally result in power losses for the entire module M1–M4. During conventional operation, faults can therefore frequently arise, since, when critical values of power-determining parameters, particularly the temperature, of individual semiconductor chips IC1–IC36 in a module M1–M4 are exceeded, the reliability of the corresponding module M1–M4 is drastically decreased. Thus, by way of example, failed read/write operations for a particular memory chip IC1–IC36 in a module M1–M4 disadvantageously result in repetition of the respective operations, which drastically reduces the throughput of the data interchanged between the respective module M1–M4 and the data bus DQ. To ensure the reliability of the entire module M1–M4, it is necessary in such a case to reduce the power, i.e. the data throughput of the respective module M1–M4, which governs said power losses for a main memory organized in a conventional manner.

FIG. 3 shows a memory apparatus similar to that in FIG. 2 having four modules M1–M4 which are connected to a common data bus DQ and each have nine memory chips IC1–IC36 on one side. The modules M1–M4 are connected to a control apparatus C in accordance with the invention by means of the data lines DQ1–DQ72 in the data bus DQ. The inventive control apparatus C has an assessment device S, a selection device E and an activation device A which are shown schematically in FIG. 3.

To perform data interchange between the modules M1–M4 and the data lines DQ1–DQ72 in the data bus DQ, the inventive method provides a variable bank organization in which a group of memory chips IC1–IC36 is selected on the basis of a prescribed criterion. To this end, the selection unit E selects a particular number of suitable memory chips IC from the total number of memory chips IC1–IC36 on the basis of the prescribed criterion. In this case, the number of selected memory chips IC is determined, depending on the respective form of the memory chips IC1–IC36, such that the total number of data line DQ1–DQ72 used by the memory chips IC1–IC36 in the group corresponds exactly to the width of the entire data bus DQ. In the case of the ×8 organization structure shown in FIG. 3, with 72 data lines and eight respective data lines per memory chip IC1–IC36, this corresponds to exactly nine memory chips IC. Since the selection is made independently of module, memory chips IC1–IC36 in all four modules M1–M4 can be selected for the group, in contrast to the firm organization in FIG. 2. On the other hand, it is also possible to operate using one or more conventionally organized memory banks, e.g. if the power-critical parameter does not exceed a critical value in any of the semiconductor chips IC1–IC36. In this case, a memory bank contains only semiconductor chips IC1–IC36 in a single rank group.

According to the interconnection of the semiconductor chips IC1–IC36 on the modules M1–M4, where the data lines DQ1–DQ72 in the data bus DQ are either firmly associated with a memory chip IC1–IC36 on a module M1–M4 or are allocated individually by a device which is not shown in the present case, the selection device E in the control apparatus C selects the memory chips IC1–IC36 on the basis of or independently of the respective position of the memory chip IC1–IC36 on the corresponding module M1–M4. In the case shown in FIGS. 2 and 3, where the memory chips IC1–IC36 arranged on the modules M1–M4 have a firm association with the data lines DQ1–DQ72 in the data bus DQ, the selection device E in the control apparatus C when selecting a memory chip IC1–IC36 for the group of memory chips IC1–IC36 also needs to take into account the position of the respective memory chip IC1–IC36 on the corresponding module M1–M4, so that no data line DQ1–DQ72 in the data bus DQ is simultaneously assigned to two or more memory chips IC1–IC36 arranged at the same position on the modules M1–M4. As FIG. 3 shows, each position for a semiconductor chip IC1–IC36 on the modules M1–M4 is therefore selected just for a single module M1–M4. All the selected semiconductor chips IC1–IC36 therefore have different positions on the corresponding modules M1–M4.

FIG. 3 thus basically indicates that memory chips from different modules M1–M4 are used for full use of the data bus DQ. Those memory chips whose connection pins are connected to the data bus DQ are shown shaded in the figure. It can be seen that the nine memory chips required for full use of the data bus DQ are arranged on different modules M1–M4. The result of the inventive assessment and selection is that the most suitable memory chips are used for the data interchange with the data bus DQ.

A criterion used for selecting a memory chip IC1–IC36 is a power-critical parameter for the respective memory chip IC1–IC36. Preferably, the temperature of the respective memory chip IC1–IC36 is suitable for this, since a central role in the operation of semiconductor chips is attached to this in the face of the drastic power losses which arise when a critical temperature value is exceeded. Furthermore, other power-related parameters for the memory chips IC1–IC36 can also be used as a selection criterion. For the purpose of monitoring the respective power-critical parameter for each memory chip IC1–IC36, the assessment device S is provided, this being in the form of a central device for detecting the temperature of the respective memory chip IC1–IC36 in FIG. 3 by way of example. In this case, the assessment device S is designed in order to detect the power-related parameters for the memory chips IC1–IC36 on the modules M1–M4 at the present time. In the present case, the temperature of the memory chips IC1–IC36 can preferably be detected using temperature sensors (not shown in this case) which can be arranged on the memory chips IC1–IC36 themselves, on the modules M1–M4 or else outside the modules, as alternatives. The power-related parameter, particularly the temperature, can also be detected centrally, however. To this end, a response for the corresponding memory chips IC1–IC36 is preferably ascertained and evaluated during operation or during a test phase. In the case of the temperature as a selection criterion, responses which are based on electrical properties of the semiconductor circuits in a memory chip IC1–IC36 are also suitable, since these can change with temperature. The temperature of a memory chip IC1–IC36 can thus be ascertained, by way of example, on the basis of an electrical resistance which a prescribed electrically conductive path in the respective memory chip IC1–IC36 has at a particular temperature.

In this case, the selection device E is preferably designed in order to use the ascertained values from the assessment device S to select suitable memory chips IC1–IC36.

In addition, in another refinement of the invention, the selection device E can select suitable memory chips IC1–IC36 using a statistical method. For this, random-based or prescribed selection patterns can be provided which can prompt an even or balanced distribution for the selected semiconductor chips IC1–IC36 and hence for the heat energy, for example. In addition, both empirical data and current assessment values can also be taken into account in this context. In particular, probabilities based on empirical data can preferably be assigned to the memory chips IC1–IC36 according to their position on a module M1–M4, these probabilities being taken into account during the selection.

When using empirical or currently ascertained data or statistical methods for selecting suitable semiconductor chips IC1–IC36, it is likewise possible to take into account the relative situation of the semiconductor chips IC1–IC36 or modules M1–M4 with respect to one another and with respect to further components. By way of example, it is also possible to include in the selection the increased heat to which the topmost modules M1–M4 are subject on account of computer systems being arranged above one another in a server arrangement.

If a group of memory chips IC1–IC36 has been selected for data interchange with the data bus DQ on the basis of a prescribed selection criterion, it is possible to activate the respective memory chips. In this case, only the memory chips IC1–IC36 in the selected group are activated by the activation device A for data interchange with the data lines DQ1–DQ72 in the data bus DQ. This allows the data interchange with the data bus DQ to be optimized, since memory chips IC1–IC36 which have been selected with regard to performance are now involved in the data interchange with the data bus DQ.

If the group is configured, i.e. suitable memory chips IC1–IC36 are selected, repeatedly, the members of the respective group can vary during operation of the memory.

Since the invention involves the composition of the active group, i.e. the memory chips IC1–IC36 activated for data interchange with the data bus DQ, being optimized with regard to a power-critical parameter for the memory chips IC1–IC36, it is possible to ensure adequate reliability for the memory chips IC1–IC36 even when these memory chips IC1–IC36 are under a high level of strain or have an unfavorable three-dimensional arrangement. The memory chips IC1–IC36 can thus be operated to a greater extent below the temperature using the inventive method, as a result of which their mean access time and hence also their general operability are improved.

FIGS. 4a and 4b show a compilation of memory chips to form an optimum bank (Bank1). The association between the memory chips IC1–IC36 and the group forming the bank is preferably made in this case using CRS indices, which are shown in the present case in the form of a table by way of example. In this context, FIG. 4a shows an association table for the organization of the memory chips IC from FIG. 3. In this case, "C" denotes the position of a memory chip IC on a module and "R" denotes the rank, that is to say the order of precedence of the group of memory chips IC which is arranged on one side of the respective module within the arrangement of modules M1–M4.

FIG. 4b also shows a further association table, which likewise shows an optimized compilation of memory chips to form a further bank (Bank2). In this case, the two tables each contain memory chips which are different than one another. In line with the invention, a plurality of optimized banks with respectively different memory chips can be provided, said memory chips being alternated in an "interleaved mode".

Figure 5:
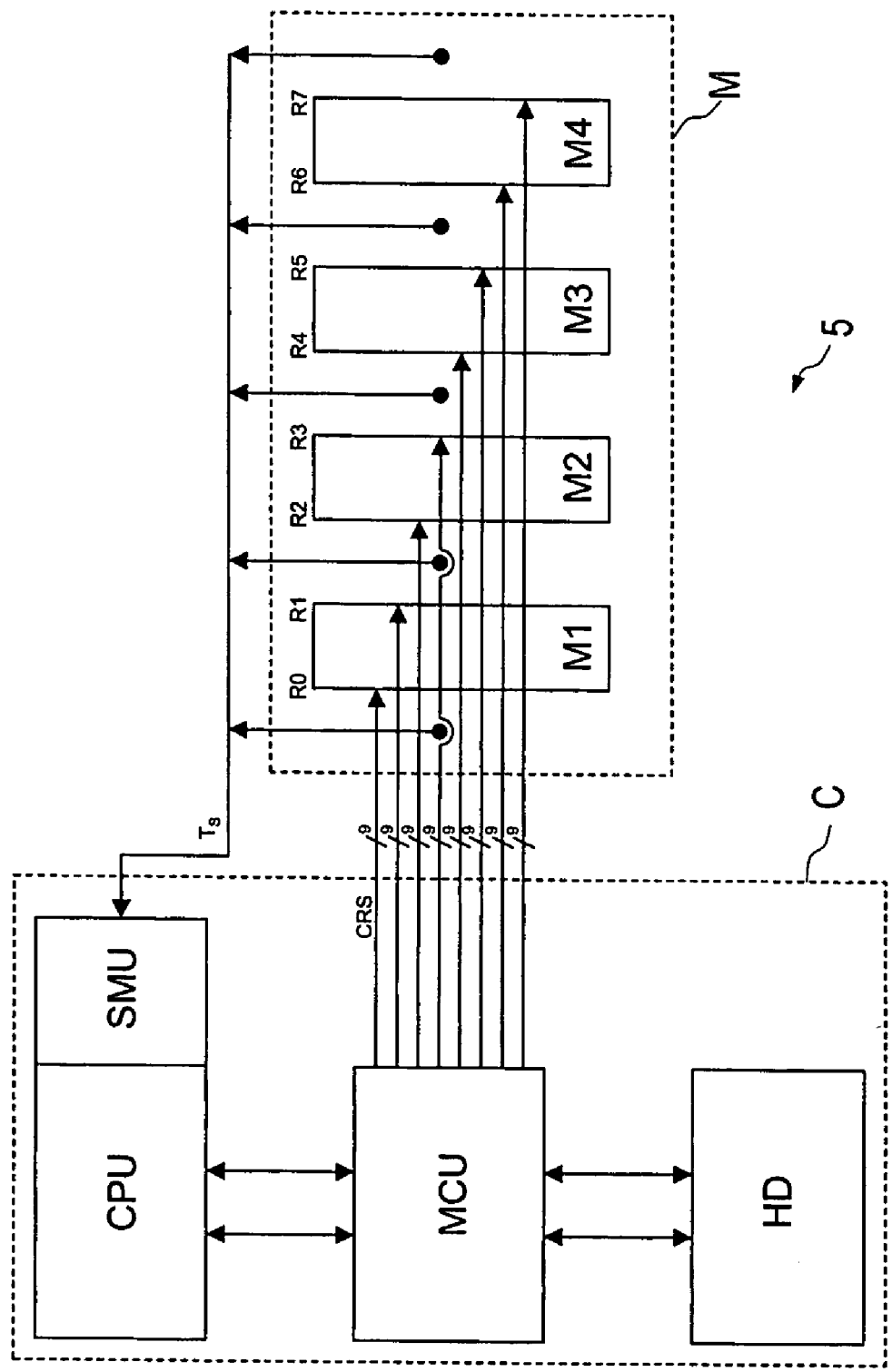

FIG. 5 shows an arrangement in accordance with the invention with a control apparatus C in accordance with the invention, by way of example. The arrangement, which is shown in greatly simplified form in this case, can be a computer system 5, for example. As FIG. 5 shows by way of example, the inventive control apparatus C also comprises a central processor unit CPU in addition to a memory control device MCU (memory controller unit) for controlling a memory M made up of four modules M1–M4. There is also a buffer store HD which is advantageously in the form of a hard disk. The buffer store HD is used for backing up the content of the memory chips IC1–IC36 on the modules M1–M4 when the memory banks are reorganized in line with the invention. In this context, buffer storage can take place in a similar manner to the inherently known swapping procedures, which involve memory contents being pushed to and fro between the central processor unit CPU, the memory M and the hard disk HD in the computer system 5.

When the memory banks have been reorganized, the data buffer stored on the hard disk can be written back to the reorganized memory chips or can be used in another way. If there are a plurality of banks organized independently of one another, an interleaved mode can also be continued without any problem.

In principle, any memory form which is suitable for use as a backup medium for the memory content of the memory chips IC1–IC36 in the respective mode of the computer device 5 is permitted as a buffer store HD in this context.

In the present example, the central processor unit CPU, which usually manages the memory M, has a selection control device SMU (select management unit) which is used for selecting the memory chips IC1–IC36 to form memory banks. In this case, the memory chips are selected for a bank using a prescribed parameter, in this case the temperature of the memory chips, which is ascertained directly in situ using specific devices (not shown in this case). The corresponding measurement signals from the memory chips are supplied to the selection control device SMU, which assesses the respective memory chips. On the basis of the assessment results, the selection control device SMU then selects the most suitable memory chips independently of module. Corresponding information about the selected memory chips can then be supplied to the memory control device MCU, which in turn can activate the corresponding memory chips IC1–IC36 on an individual basis for data interchange with the data bus DQ (not shown in this case) in the computer system 5. In this case, the selected group of memory chips IC1–IC36 is preferably activated using control lines CRS0–8 which are connected to the respective modules M1–M4. It is advantageous in this context to provide each memory chip IC1–IC36 on a module M1–M4 with a separate control line CRS0–8 which acts as a kind of on/off switch for the respective memory chip IC1–IC36. However, it is also conceivable for there to be a multiplexer which can address all memory chips IC1–IC36 using a smaller number of control lines CRS0–8. Similarly, the activation information for the individual memory chips IC1–IC36 can be sent via already existing lines, depending on the application.

FIG. 5 shows, merely schematically, eight individual control lines CRS0–8 which are each connected to nine memory chips IC (not shown in the present case) in a group of memory chips IC which is called a rank R0–R7. All the memory chips IC in one of these groups are respectively arranged on one side of a memory module M1–M4 which has components on two sides. As indicated, the individual control lines CRS0–8 each have a width of nine bits in the present case.

The control apparatus C shown in FIG. 5 is merely an exemplary embodiment. The selection control device SMU described does not necessarily have to be integrated within the central processor unit CPU. The memory chips IC can also be assessed and selected within the memory control device MCU, for example. It would likewise be possible to dispense with the buffer store HD for reorganization, depending on the application.

In the text below, two different application scenarios are used to describe how the invention can be used for a computer system 5 shown in greatly simplified form in FIG. 5.

Scenario 1.

By way of example, provision can be made for a minimal operating system (BIOS) implemented within the central processor unit CPU to evaluate the main memory available in the modules M1–M4 while the computer system 5 is starting up. During startup, which is also called the bootup or startup procedure, the memory physically available on the modules M1–M4 is partitioned to form a virtual memory, the virtual memory corresponding to a map of the physical memory in a linear address space. This ensures an explicit association between the main memory available in the memory modules M1–M4 and the virtual memory. Said partitioning is known per se and is not the subject matter of the present invention. The linear address space obtained as the result of the partitioning which has been carried out is stored in a management unit (not shown in this case) which is arranged within the central processor unit CPU.

At the beginning of startup of the computer system 5, the inventive method is also carried out just once using the inventive control apparatus C. The selection made at the time for one or more groups of memory chips IC for data interchange with the data bus DQ preferably remains unchanged for the rest of the operation of the computer system 5. The inventive method is then not carried out again until the computer system 5 next starts up.

Scenario 2.

Unlike in scenario 1, the inventive method is repeated in this case. For this purpose, in addition to the variant described above, a buffer store HD, preferably a hard disk store, is used in order to ensure the data integrity at a time at which the memory chips IC are undergoing renewed assessment and selection. For this purpose, the entire content of the main memory which is available in the modules M1 to M4 is buffer stored in the hard disk store HD before any reorganization of the memory chips IC. The result of the respective assessment performed can be stored in a special register/latch device RL (Bank Select Register/Latch) by the corresponding selection device E and can be read again during a memory access operation. In this way, data interchange can take place between the respectively selected memory chips IC1–IC36 and the data bus DQ without data being lost, for example as a result of information stored in the memory chips IC beforehand being overwritten when the memory banks are reorganized.

The frequency with which the most suitable memory chips IC are assessed and selected in line with the invention can advantageously be variable. It is thus conceivable, by way of example, for the memory chips IC1–IC36 to be assessed in line with the invention in a background process which is parallel to working operation. Compilation of the memory chips to form optimum groups on the basis of the assessment is then performed in the time in which the hard disk store HD is ensuring data interchange. It is likewise conceivable for the inventive method to be carried out in times in which there is currently no data interchange taking place between the memory chips IC1–IC36 on the modules M1–M4 and the data bus DQ. It is also conceivable for the inventive method to be carried out after a respective defined number of data interchange cycles on the signal line bus DQ. In this context, the inventive reorganization of the memory banks can take place cyclically in periods of between a few seconds and many minutes.

Hence, in this example of application, the hard disk store HD is used to ensure data integrity in phases of the operation of the computer system 5 in which the memory chips are being reselected in line with the invention. In addition, for reasons of data integrity, reselection of the memory chips in line with the invention, that is to say reorganization of the selected group, is prevented from taking place during any signal transmission which is in progress. This means that changing over to a reconfigured memory bank formed by reselected memory chips IC1–IC36 has to take place in a defined manner.

The invention in scenario 2 can therefore be considered to be an adaptive method which can advantageously be used to match the configuration or the organization of the memory banks in a computer system 5 to changing operating conditions in the computer system 5 in the best possible way.

In the event of the memory banks being reorganized during ongoing operation, it may be necessary to repartition the memory which is physically available on the modules M1–M4.

Alternatively, it is likewise conceivable to use the inventive method where there is temporarily no demand being made on the data integrity on account of particular operating states. This can be the case, for example, when the entire memory content becomes redundant at a particular time. By way of example, a graphics memory in a computer system in which a particular screen content is stored can be erased completely if a new screen content needs to be displayed. Any reorganization carried out at this time can also be done without buffer-storing the memory content.

Figure 6:
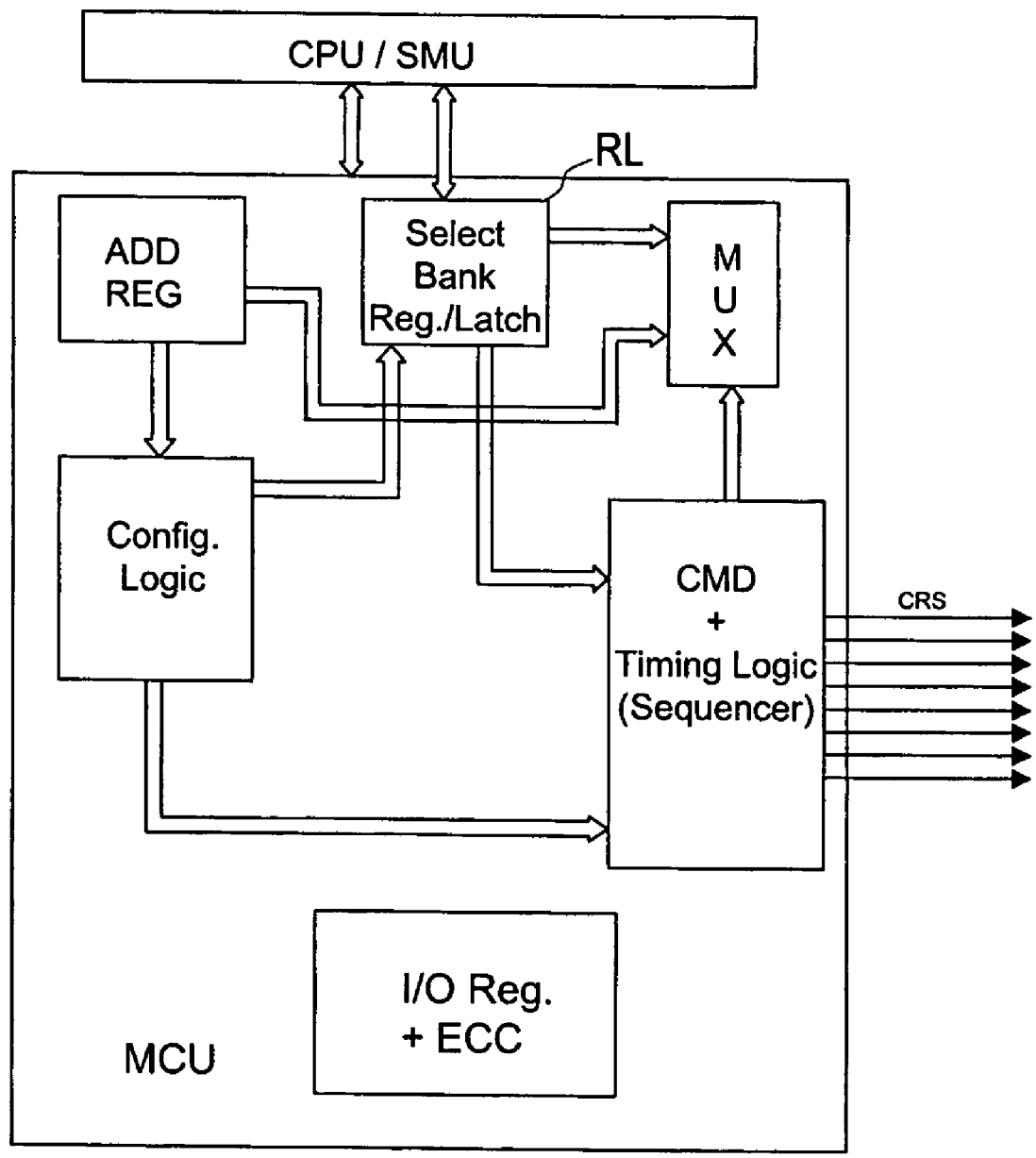

FIG. 6 schematically shows one possible design of a memory control device MCU in accordance with the invention. In this case, the memory control device MCU has, besides components which are known per se, an additional register/latch device RL (Select Bank Reg./Latch) for storing the configuration of the memory banks. In this context, information about the selected memory chips can be stored in the register/latch device RL by the selection control device SMU in the central processor unit CPU in a manner which is shown in FIGS. 4a and 4b, where each memory chip is identified by means of an individual CRS index. If data access is taking place, this information can be read by a sequencer (CMD+Timing Logic) which activates the corresponding memory chips IC on the basis of their CRS indices. To this end, as indicated in FIG. 6, additional control lines CRS0–8 can be provided between the sequencer and the individual memory chips IC, these being used to actuate the corresponding memory chips IC.

For an interleaved mode of the memory M, a plurality of mutually independent banks can be stored within the register/latch device RL, these being alternated in a conventional manner.

In principle, it is also conceivable to have systems in which the inventive register/latch device RL for storing the configuration of the memory banks is arranged outside the selection control device SMU.

Figure 7:
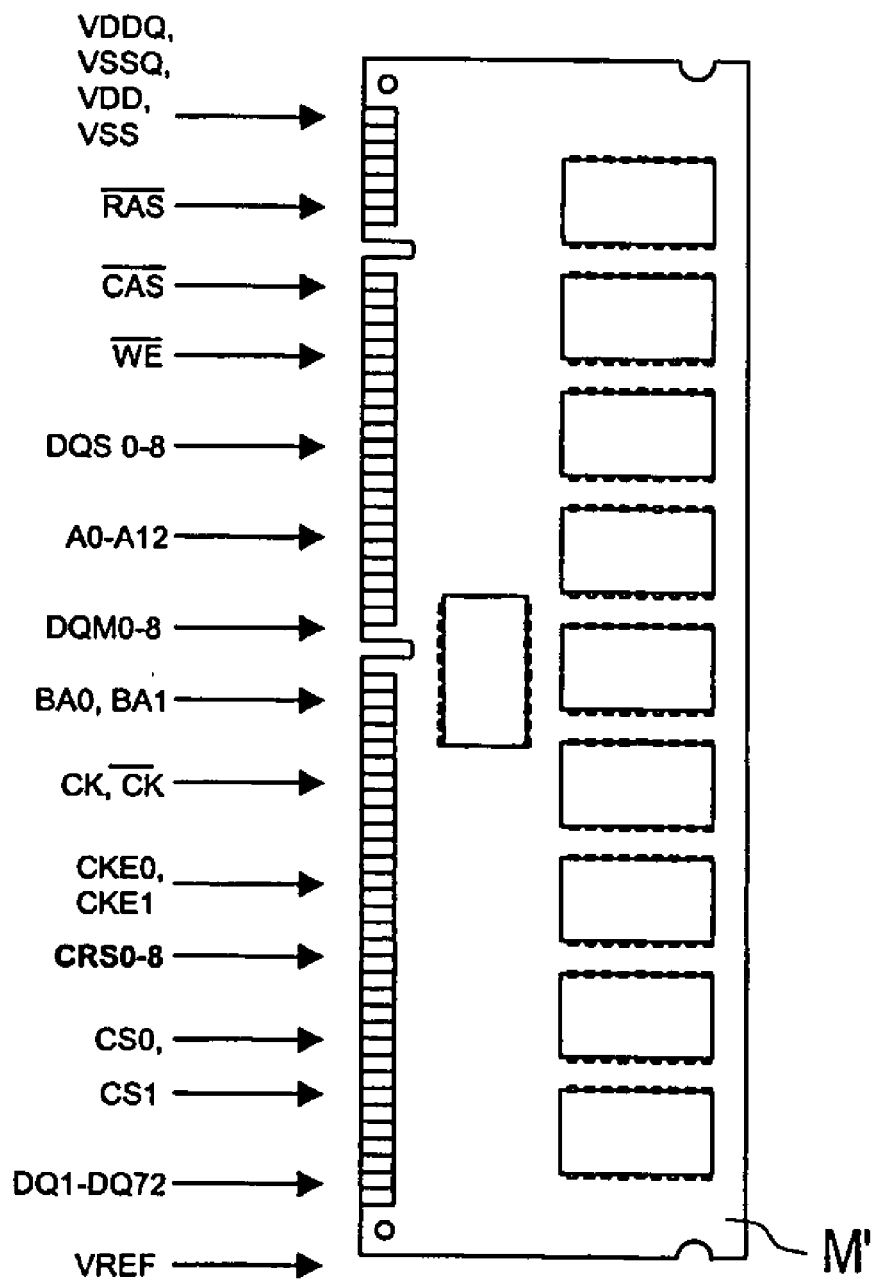
FIG. 7 shows the use of the signal and data lines in a DRAM module in accordance with the invention by way of example.

FIG. 7 shows, in greatly simplified form, use of the connections on an inventive memory module M'. This memory module M', which, by way of example, represents one of the modules M1–M4 shown in the preceding figures, is in the form of a DDRI DRAM in this case. Besides the inherently known lines for voltage supply, signaling and data transfer in the module M', there are additional signal lines CRS0–8 for activating the memory chips IC on the respective module M'. In this case, each of the memory chips IC arranged on the module M' can be addressed either via an individual signal line CRS0–8 or via signal lines (not shown in the present case) which are jointly associated with all the memory chips IC on the respective module M'. In the first case, most of the signal lines are needed, since each memory chip IC interprets only the voltage level on the signal line CRS0–8 which is associated with it. In the latter case, although it is possible to save signal lines, since, as in the case of memory addressing, the information about the selected memory chips IC is transmitted to the respective memory chips IC using common signal lines CRS0–8, this requires further circuits on the modules which allow correct association of the CRS control signals with the respective memory chips IC. In addition, systems are also conceivable in which the CRS control signals used for activation are transmitted via already existing signal lines, e.g. via the address lines A0–A12 in the data bus DQ, e.g. in particular time windows.

The features of the invention which have been disclosed in the description above, in the claims and in the drawings can play a fundamental part either individually or in any desired combination for the purpose of implementing the invention in its various embodiments. In particular, it is within the scope of the invention for the inventive method, which relates to DRAM memory chips in the description above by way of example, to be applied to any semiconductor chips arranged in groups on modules.

The invention claimed is:

1. A method for operating semiconductor chips, particularly memory chips, which are arranged in groups on modules which are connected to a common data bus, wherein each semiconductor chip on each module is connected to at least one data line in the common data bus, comprising the following method steps:
   a) selecting a group of semiconductor chips from the semiconductor chips arranged on the modules based on a prescribed selection criterion independently of on which modules the semiconductor chips reside, the selected group of semiconductor chips using data lines in the common data bus over the entire bus width;
   b) activating the semiconductor chips in the selected group; and
   c) performing data interchange between the data lines in the common data bus and the selected group of semiconductor chips;
   wherein the semiconductor chips are selected using a statistical method.

2. The method as claimed in claim 1,
wherein the statistical method takes into account at least one of an arrangement of the semiconductor chips on the modules and an arrangement of the modules in relation to one another or in relation to one or more other adjacent components.

3. The method as claimed in claim 1,
wherein the statistical method takes into account at least one of empirically obtained and currently ascertained data.

4. The method as claimed in claim 1, wherein method steps a) to c) take place at the beginning of a startup procedure in which the semiconductor chips are started.

5. The method as claimed in claim 1, wherein the semiconductor chips are memory chips, and wherein the method steps a) to c) take place at a time at which content of the memory chips is redundant.

6. The method as claimed in claim 1, wherein the semiconductor chips are memory chips, and wherein data already stored in the memory chips are stored in a buffer store before a group of memory chips is selected in method step a).

7. A method for operating semiconductor chips, particularly memory chips, which are arranged in groups on modules which are connected to a common data bus, wherein each semiconductor chip on each module is connected to at least one data line in the common data bus, comprising the following method steps:
   a) selecting a group of semiconductor chips from the semiconductor chips arranged on the modules based on a prescribed selection criterion independently of on which modules the semiconductor chips reside, the selected group of semiconductor chips using data lines in the common data bus over the entire bus width;
   b) activating the semiconductor chips in the selected group; and
   c) performing data interchange between the data lines in the common data bus and the selected group of semiconductor chips;
   wherein each of the semiconductor chips has an associated selection probability.

8. The method as claimed in claim 7,
wherein the semiconductor chips are arranged in three dimensions with respect to one another; and
wherein the associated selection probability for a semiconductor chip depends on its relative situation with respect to adjacent semiconductor chips, and wherein a semiconductor chip in an outer region of the modules has a higher selection probability than a semiconductor chip in an inner region.

9. A method for operating semiconductor chips, particularly memory chips, which are arranged in groups on modules which are connected to a common date bus, wherein each semiconductor chip on each module is connected to at least one data line in the common data bus, comprising the following method steps:
   a) selecting a group of semiconductor chips from the semiconductor chips arranged on the modules based on a prescribed selection criterion independently of on which modules the semiconductor chips reside, the selected group of semiconductor chips using data lines in the common data bus over the entire bus width;
   b) activating the semiconductor chips in the selected group; and
   c) performing data interchange between the data lines in the common data bus and the selected group of semiconductor chips;
   wherein the prescribed selection criterion is a temperature of the semiconductor chips and wherein semiconductor chips having the lowest temperature are selected.

10. The method as claimed in claim 9,
wherein method steps a) to c) are repeated and different semiconductor chips are selected in method step a) in a course of two cycles taking place at successive times.

11. A method for operating semiconductor chips, particularly memory chips, which are arranged in groups on modules which are connected to a common data bus, wherein each semiconductor chip on each module is connected to at least one data line in the common data bus, comprising the following method steps:
   a) selecting a group of semiconductor chips from the semiconductor chips arranged on the modules based on a prescribed selection criterion independently of on which modules the semiconductor chips reside, the selected group of semiconductor chips using data lines in the common data bus over the entire bus width;
   b) activating the semiconductor chips in the selected group; and
   c) performing data interchange between the data lines in the common data bus and the selected group of semiconductor chips;
   wherein each of the semiconductor chips arranged on the modules has an associated individual index which denotes a corresponding module and a position of a corresponding semiconductor chip on the corresponding module;
   wherein associated indices for the group of semiconductor chips which was selected independently of the modules in method step a) are stored in a register device; and
   wherein the associated indices for the semiconductor chips associated with a corresponding group are read from the register device in method step b) and corresponding semiconductor chips are activated using their associated indices.

12. A method for operating semiconductor chips, particularly memory chips, which are arranged in groups on modules which are connected to a common data bus, wherein each semiconductor chip on each module is connected to at least one data line in the common data bus, comprising the following method steps:
   a) selecting a group of semiconductor chips from the semiconductor chips arranged on the modules based on a prescribed selection criterion independently of on which modules the semiconductor chips reside, the selected group of semiconductor chips using data lines in the common data bus over the entire bus width;
   b) activating the semiconductor chips in the selected group; and
   c) performing data interchange between the data lines in the common data bus and the selected group of semiconductor chips;
   wherein, besides the group of semiconductor chips which is selected in method step a), a further group of further semiconductor chips is selected independently of module, and the semiconductor chips in this further group likewise use the data lines in the common data bus over the entire bus width, and
   wherein the data interchange between the data lines in the data bus and the semiconductor chips in the group selected in method step c) involves alternating between groups of semiconductor chips.

13. A control apparatus for operating semiconductor chips, particularly memory chips, which are arranged in groups on modules which are connected to a common data bus;
   wherein each semiconductor chip on each module is connected to at least one data line in the common data bus, comprising:
   a selection device for selecting the semiconductor chips for a group cyclically based on a prescribed selection criterion independently of on which modules the semiconductor chips reside; and
   an activation device for activating the semiconductor chips in the selected group for data interchange with data lines in the common data bus;
   wherein the selection device is configured to assign each semiconductor chip an individual selection probability based on its relative situation in a three-dimensional arrangement of the semiconductor chips.

14. A control apparatus for operating semiconductor chips, particularly memory chips, which are arranged in groups on modules which are connected to a common data bus;
   wherein each semiconductor chip on each module is connected to at least one data line in the common data bus, comprising:
   a selection device for selecting the semiconductor chips for a group cyclically based on a prescribed selection criterion independently of on which modules the semiconductor chips reside;
   an activation device for activating the semiconductor chips in the selected group for data interchange with data lines in the common data bus; and
   an assessment device for assessing the semiconductor chips according to prescribed criteria, particularly a temperature of the semiconductor chips, and
   wherein the selection device is configured to select the semiconductor chips based on assessment results from the assessment device.

15. A control apparatus for operating semiconductor chips, particularly memory chips, which are arranged in groups on modules which are connected to a common data bus;
   wherein each semiconductor chip on each module is connected to at least one data line in the common data bus, comprising:
   a selection device for selecting the semiconductor chips for a group cyclically based on a prescribed selection criterion independently of on which modules the semiconductor chips reside; and
   an activation device for activating the semiconductor chips in the selected group for data interchange with data lines in the common data bus;
   wherein the activation device is configured to activate the semiconductor chips in an active group using an index which is individually associated with each of the semiconductor chip and denotes a corresponding module and a position of a corresponding semiconductor chip within the corresponding module.

16. A control apparatus for operating semiconductor chips, particularly memory chips, which are arranged in groups on modules which are connected to a common data bus;
   wherein each semiconductor chip on each module is connected to at least one data line in the common data bus, comprising:
   a selection device for selecting the semiconductor chips for a group cyclically based on a prescribed selection criterion independently of on which modules the semiconductor chips reside;
   an activation device for activating the semiconductor chips in the selected group for data interchange with data lines in the common data bus; and
   a register device for storing the information about an association between the semiconductor chips and an active group of semiconductor chips.

17. A control apparatus for operating semiconductor chips, particularly memory chips, which are arranged in groups on modules which are connected to a common data bus;
   wherein each semiconductor chip on each module is connected to at least one data line in the common data bus, comprising:
   a selection device for selecting the semiconductor chips for a group cyclically based on a prescribed selection criterion independently of on which modules the semiconductor chips reside; and
   an activation device for activating the semiconductor chips in a selected group for data interchange with data lines in the common data bus;
   wherein the selection device is configured to select the semiconductor chips for an active group based on a temperature of the semiconductor chips.

18. A control apparatus for operating semiconductor chips, particularly memory chips, which are arranged in groups on modules which are connected to a common data bus;
   wherein each semiconductor chip on each module is connected to at least one data line in the common data bus, comprising:
   a selection device for selecting the semiconductor chips for a group cyclically based on a prescribed selection criterion independently of on which modules the semiconductor chips reside; and
   an activation device for activating the semiconductor chips in a selected group for data interchange with data lines in the common data bus;
   wherein the selection device is configured to select the semiconductor chips for an active group using a statistical method.

* * * * *

UNITED STATES PATENT AND TRADEMARK OFFICE
CERTIFICATE OF CORRECTION

| | |
|---|---|
| PATENT NO. | : 6,986,118 B2 |
| APPLICATION NO. | : 10/672145 |
| DATED | : January 10, 2006 |
| INVENTOR(S) | : Rory Dickman |

It is certified that error appears in the above-identified patent and that said Letters Patent is hereby corrected as shown below:

In Column 4, Line 49, replace "SDRAMS" with --SDRAMs--.

In Column 5, Line 3, replace "and also the high clock rates used can easily reach a" with -- and also the high clock rates used for operating them, semiconductor chips IC1-IC36 today can easily reach a--.

In Column 5, Line 47, replace "DJMMs" with -- DIMMs --.

In Column 5, Line 64, replace "memorychips" with -- memory chips --.

In Column 6, Line 59, replace "line" with --lines--.

In Claim 4, at Column 13, Line 13, replace "started." with --started up.--.

In Claim 9, at Column 13, Line 52, replace "date" with -- data --.

Signed and Sealed this

Tenth Day of July, 2007

JON W. DUDAS
*Director of the United States Patent and Trademark Office*